(12) United States Patent
Chen et al.

(10) Patent No.: US 10,992,774 B2
(45) Date of Patent: Apr. 27, 2021

(54) DEVICE-FREE ACTIVITY IDENTIFICATION USING FINE GRAINED WIFI SIGNATURES

(71) Applicants: THE TRUSTEES OF THE STEVENS INSTITUTE OF TECHNOLOGY, Hoboken, NJ (US); RUTGERS, THE STATE UNIVERSITY OF NEW JERSEY, New Brunswick, NJ (US)

(72) Inventors: Yingying Chen, Morganville, NJ (US); Jie Yang, Tallahassee, FL (US); Yan Wang, Jersey City, NJ (US); Jian Liu, Jersey City, NJ (US); Marco Gruteser, Princeton, NJ (US)

(73) Assignees: THE TRUSTEES OF THE STEVENS INSTITUTE OF TECHNOLOGY, Hoboken, NJ (US); RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

(21) Appl. No.: 16/746,195

(22) Filed: Jan. 17, 2020

(65) Prior Publication Data
US 2020/0153936 A1 May 14, 2020

Related U.S. Application Data

(63) Continuation of application No. 16/160,979, filed on Oct. 15, 2018, now Pat. No. 10,623,519, which is a (Continued)

(51) Int. Cl.
*H04L 29/08* (2006.01)
*H04W 4/02* (2018.01)
(Continued)

(52) U.S. Cl.
CPC .......... *H04L 67/306* (2013.01); *H04W 4/027* (2013.01); *H04W 4/029* (2018.02); *H04W 4/30* (2018.02);
(Continued)

(58) Field of Classification Search
CPC ...... H04L 67/306; H04W 4/30; H04W 4/029; H04W 4/027; H04W 4/33; H04W 88/08; H04W 84/12
See application file for complete search history.

(56) References Cited

U.S. PATENT DOCUMENTS 9,798,860 B1 * 10/2017 Movva ................ A61B 5/0017
2002/0111172 A1 * 8/2002 DeWolf ................ G06Q 30/02
455/456.3

(Continued)

*Primary Examiner* — Hashim S Bhatti
(74) *Attorney, Agent, or Firm* — Lewis Roca Rothgerber Christie LLP

(57) ABSTRACT

A system includes a device that is disposed within an environment and is adapted to communicate over a radio frequency communication link. The system also includes a wireless access point disposed within the environment, including a wireless transceiver in communication with the device over a radio frequency communication link using a plurality of channels, and recording a channel state information data set for the radio frequency communication link. The system also includes a monitoring device including a memory storing a plurality of activity profiles, each of which includes an activity and a channel state information profile corresponding to the activity, and a processor receiving, from the wireless access point, the channel state information data set and determining, based on a comparison of the channel state information data set to the channel state information profile of each of the plurality of activity profiles, the activity of the person in the environment.

20 Claims, 6 Drawing Sheets

Related U.S. Application Data continuation of application No. 15/074,305, filed on Mar. 18, 2016, now Pat. No. 10,104,195.

(60) Provisional application No. 62/135,776, filed on Mar. 20, 2015.

(51) Int. Cl.
*H04W 4/029* (2018.01)
*H04W 4/30* (2018.01)
*H04W 88/08* (2009.01)
*H04W 84/12* (2009.01)
*H04W 4/33* (2018.01)

(52) U.S. Cl.
CPC .............. *H04W 4/33* (2018.02); *H04W 84/12* (2013.01); *H04W 88/08* (2013.01)

(56) References Cited

U.S. PATENT DOCUMENTS

| | | | | |
|---|---|---|---|---|
| 2013/0308508 A1* | 11/2013 | Ji | ............................. | G01N 29/04 370/311 |
| 2014/0194139 A1* | 7/2014 | Yang | ...................... | G01S 5/0252 455/456.1 |
| 2014/0334264 A1* | 11/2014 | Thaker | .................... | G01S 19/45 367/118 |
| 2015/0264589 A1* | 9/2015 | Kalkunte | ............ | H04W 36/165 370/329 |
| 2015/0312877 A1* | 10/2015 | Bhanage | ................ | H04W 4/029 455/456.5 |
| 2016/0066158 A1* | 3/2016 | Xiao | ....................... | H04W 4/33 455/456.1 |

* cited by examiner

DEVICE-FREE ACTIVITY IDENTIFICATION USING FINE GRAINED WIFI SIGNATURES

CROSS-REFERENCE TO RELATED APPLICATIONS

This application is a continuation of U.S. application Ser. No. 16/160,979 filed Oct. 15, 2018, which is a continuation of U.S. application Ser. No. 15/074,305 filed Mar. 18, 2016, now U.S. Pat. No. 10,104,195 issued Oct. 16, 2018, which claims priority to U.S. Provisional Application No. 62/135,776 filed Mar. 20, 2015, the entire disclosures of each of the aforesaid applications being incorporated herein by reference.

GOVERNMENT LICENSE RIGHTS

This invention was made with government support under Grants CNS1217387, CNS 0845896 and IIS-1211079 awarded by the National Science Foundation. The government has certain rights in the invention.

FIELD OF THE INVENTION

The exemplary embodiments relate generally to wireless information systems applications, to the use of performance data recorded by wireless networking devices to infer information about the physical environment in which such devices are present.

BACKGROUND OF THE INVENTION

Activity monitoring in home environments has become increasingly important and has the potential to support a broad array of applications including elder care, well-being management, and latchkey child safety. By tracking a sequence of meaningful activities and generating statistics for a person, it may be possible to monitor well-being and suggest behavioral changes that can improve health. In aging-in-place settings, such tracking can be helpful to understand whether established routines are still followed, since the absence of usual activities can be an important indicator for detecting falls and other situations of need.

Traditional activity identification approaches involve wearable sensors and specialized hardware installations. Sensors can be either attached to a person's body, or placed on target objects with which people interact. In one previous technique, an accelerometer is attached on human body to detect falls in Philips Lifeline. In another, a motion sensor is attached to a door to detect movement. Other previous techniques involve a wearable acoustic sensor for classifying activities, such as eating and coughing. Vision based systems can also be used to track user movements and gestures. These dedicated sensors can achieve fine-grained activity recognition. However, they need the installation and maintenance of dedicated sensors, which usually entail high costs and are thus not scalable.

A single wireless monitor used to detect human movement or location can also be used for activity recognition. The granularity of the activity can be inferred from these systems is either modest or fine-grained. However, these systems all require a specialized WiFi monitor for extracting the carrier wave.

SUMMARY OF THE INVENTION

In an embodiment, a system for identifying an activity of a person in an environment includes a stationary device, a wireless access point, and a monitoring device. The stationary device is disposed within the environment and is adapted to communicate over a radio frequency communication link. The wireless access point is disposed within the environment and includes a wireless transceiver in communication with at least the stationary device over a corresponding one of at least one radio frequency communication link. Each of the at least one radio frequency communication link uses a plurality of channels. The wireless access point is configured to record a channel state information data set. The channel state information data set is recorded for said one of the at least one radio frequency communication link at a corresponding time. The monitoring device includes a memory storing a plurality of activity profiles. Each of the activity profiles includes an activity and at least one channel state information profile corresponding to the activity. The monitoring device also includes a processor receiving, from the wireless access point, the channel state information data set and determining, based on a comparison of the channel state information data set to each of the at least one channel state information profile of each of the plurality of activity profiles, the activity of the person in the environment at the time corresponding to the channel state information data set.

In an embodiment, the monitoring device determines the activity by classifying the activity as one of a walking activity and an in-place activity; if the activity is classified as a walking activity, identifying the walking activity; and, if the activity is classified as an in-place activity, identifying the in-place activity. In an embodiment, the monitoring device classifies the activity as one of a walking activity and an in-place activity by determining a moving variance based on the channel state information data set and a further channel state information data set and comparing the moving variance to a threshold. In an embodiment, the monitoring device classifies the activity as a walking activity if the moving variance is greater than the threshold.

In an embodiment, the monitoring device identifies the in-place activity by comparing a histogram of the channel state information data set to a histogram of each of the at least one channel state information profile of each of the plurality of activity profiles. In an embodiment, the monitoring device compares the histogram of the channel state information data set to the histogram of each of the at least one channel state information profile of each of the plurality of activity profiles using an earth mover's distance comparison.

In an embodiment, the monitoring device identifies the walking activity by comparing a time series of the channel state information data set to a time series of each of the at least one channel state information profile of each of the activity profiles. In an embodiment, the monitoring device compares the time series of the channel state information data set to a time series of each of the at least one channel state information profile of each of the activity profiles using dynamic time warping.

In an embodiment, the plurality of activity profiles are determined based on user feedback. In an embodiment, the determination of the plurality of activity profiles includes clustering similar channel state information samples in an initial data set and receiving user input corresponding to the clustered channel state information samples to define one of said plurality of activity profiles. In an embodiment, when the monitoring device determines that no activity profile matches the channel state information data set, the monitoring device receives user input to define a new activity profile for the channel state information data set.

In an embodiment, the monitoring device filters the channel state information data set before determining the activity. In an embodiment, the filtering includes applying a dynamic exponential smoothing filter to the channel state information data set. In an embodiment, the filtering includes removing, from the channel state information data set, data points having a modulation and coding scheme index less than a threshold value. In an embodiment, the threshold value is about 263.

In an embodiment, the wireless access point is a WiFi access point. In an embodiment, the WiFi access point is an 802.11n access point.

In an embodiment, the system also includes a further stationary device disposed within the environment. The wireless transceiver of the wireless access point is in communication with the further stationary device over a corresponding further one of the at least one radio frequency communication link. The wireless access point is configured to record a further channel state information data set for the further one of the at least one radio frequency communication link at a corresponding time. In an embodiment, the determining the activity of the person in the environment includes determining the activity of the person in the environment based on a comparison of the further channel state information data set to each of the at least one channel state information profile of each of the plurality of activity profiles. In an embodiment, the activity is determined based on a sum of a similarity measurement of the channel state information data set and a similarity measurement of the further channel state information data set.

DETAILED DESCRIPTION OF THE INVENTION

The exemplary embodiments relate to identification of human daily activities, including both in-place activities and walking movements in home environments, without the monitored individual being required to wear any devices. The information of activities being tracked may be an important indicator to monitor well-being and suggest behavioral changes that improve health. The exemplary embodiments involve matching of real-time channel state information ("CSI") patterns provided by WiFi devices (e.g., IEEE 802.11n devices) against activity profiles to distinguish various activities. The exemplary embodiments may be used to monitor human activities and provide feedback for healthcare improvement, and may also help other applications which rely on identified users' in-home activities, such as smart home applications.

The exemplary embodiments obtain wireless signals from off-the-shelf WiFi devices, such as a WiFi adapter that may be present in a notebook computer or mobile device, and classify the wireless signals as belonging to an in-place or a walking activity. These two types of activities are referred as loosely-defined because they may involve non-repetitive body movements and the sequences of body movements involved may not remain the same across repetition. Examples of loosely-defined in-place activities include, but are not limited to, cooking dinner in front of the stove, eating dinner at the dining table, exercising on a treadmill, or working at a desk. Walking activities involve movements between rooms or across a larger room. The exemplary embodiments apply matching algorithms to compare the amplitude measurements against known profiles that identify the activity. If known profiles do not exist or change afterwards, the exemplary embodiments may also apply semi-supervised learning strategies to establish or adaptively update profiles. The exemplary embodiments may be referred to as "device-free" because they rely only on an existing WiFi environment (e.g., smart appliances connecting to a WiFi access point), and the monitored individual performing the detected activities does not have to carry any device. Thus, the exemplary embodiments allow use of an existing WiFi access point deployment in homes for location-oriented activity recognition, without the need for additional stationary infrastructure or wearable sensors.

Figure 1:
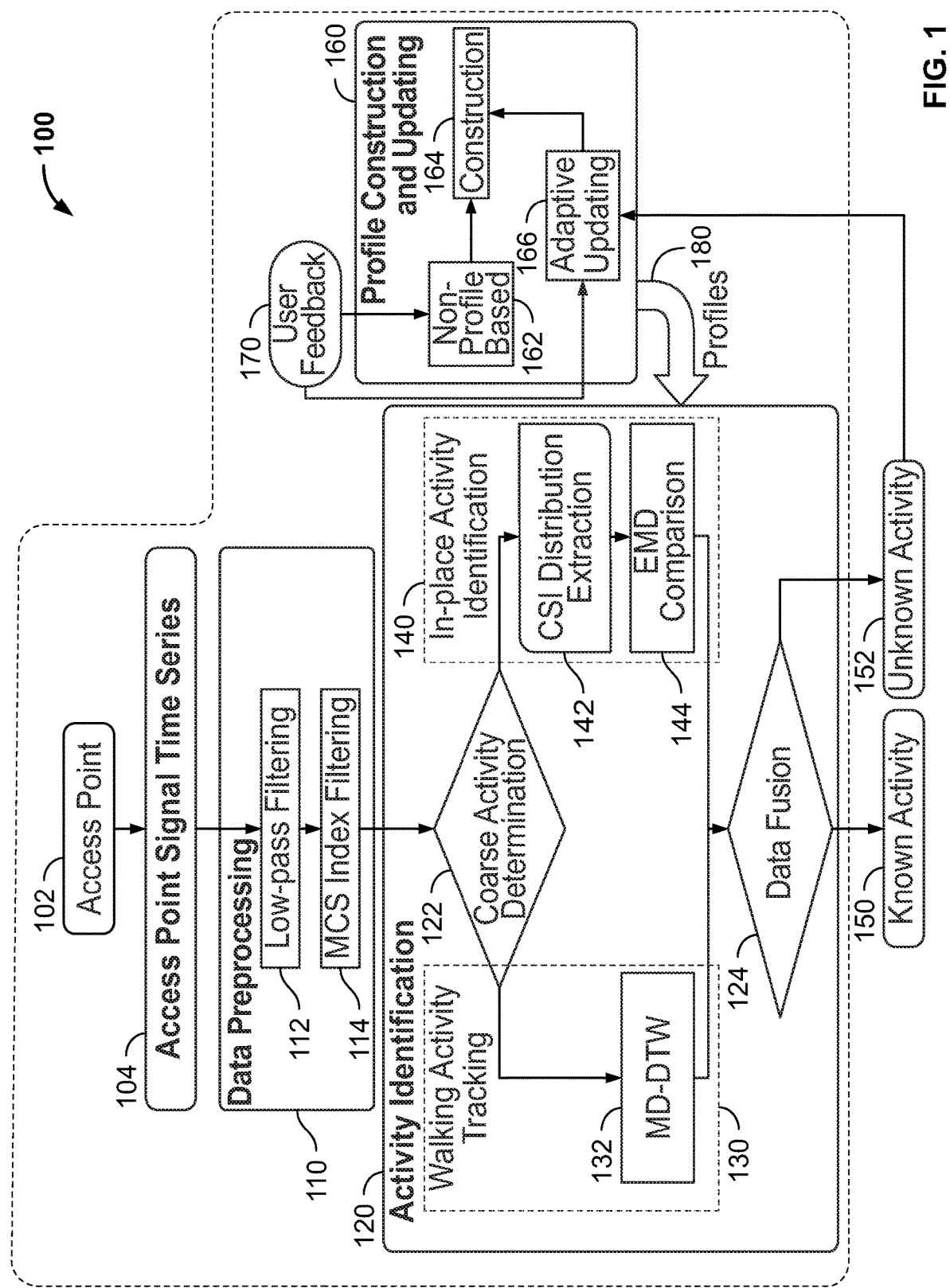
FIG. 1 schematically illustrates an exemplary system and the process flow therein.

FIG. 1 schematically illustrates an exemplary system 100 and the process flow within the exemplary system 100. The exemplary system 100 uses, as input, time-series amplitude measurements, i.e., the amplitude on each of a plurality of subcarriers on a link at each instance in the time series. Such measurements can be collected at a single Access Point 102 with off-the-shelf hardware (e.g., a wireless transceiver). The measurements may be referred to herein as a data sample 104. The system 100 will be described herein with reference to a plurality of modules. It will be apparent to those of skill in the art that the modules described herein may be implemented in a variety of manners, including through the use of software, hardware, or a combination thereof. The amplitude measurements are available for each subcarrier on a wireless communications link (e.g., a data connection in the radio frequency spectrum) and may be collected over one or more links to rarely-moved devices (such as home entertainment devices or appliances). The exemplary embodiments may take advantage of CSI measurements from existing traffic across these links; if insufficient network traffic is available, the Access Point 102 may also be configured generate periodic traffic for measurement purposes. The data may then be preprocessed to remove outliers via a low-pass filter and to filter out artifacts introduced by rate adaptation, whereby the radios switch to different modulation and coding schemes.

The system 100 includes a Data Pre-processing Module 110. The Data Pre-Processing Module 110 includes a Low-Pass Filtering Module 112, which aims to remove high frequency noise, which is unlikely to be caused by human activities as human activities usually have a low frequency range. In an embodiment, the Low-Pass Filtering Module 112 includes a dynamic exponential smoothing filter ("DESF"), which is an exponential smoother that changes its smoothing factor dynamically according to previous samples. In an embodiment, the DESF can remove high frequency noise and preserve the features affected by human activities in the CSI measurements.

The Data Pre-Processing Module 110 also includes a Modulation and Coding Scheme ("MCS") Index Filtering Module 114. The MCS index is a specification of the high-throughput physical layer parameter in the IEEE 802.11n standard. The MCS index contains information including modulation order (e.g., BPSK, QPSK, 16-QAM, 64-QAM), forward error correction ("FEC") coding rate, etc. for transmitting a packet. Each 802.11n packet header contains a 16-bit MCS index, which can be extracted together with the CSI sample of each packet. In an embodiment, the MCS Index Filtering Module 114 filters out CSI measurements having an MCS index value less than 263 and retains remaining CSI measurements. Such filtering may result in relatively stable CSI measurements.

The exemplary system 100 includes two core modules: Activity Identification Module 120 and Profile Construction and Updating Module 160, which, respectively, analyze and create Profiles 180 describing various activities. The exemplary Activity Identification Module 120 includes a Coarse Activity Determination Module 122 that distinguishes between walking activities and in-place activities. In general, a walking activity causes significant pattern changes of the CSI amplitude over time, since it involves significant body movements and location changes. In contrast, an in-place activity (such as watching TV on a sofa) only involves relative smaller body movements and will not cause significant amplitude changes, but presents certain repetitive patterns within the CSI measurements. Therefore, the Coarse Activity Determination Module 122 applies a moving variance thresholding technique to differentiate between the two types of activities. Cumulative moving variance across all subcarriers can be expected to be greater for walking activities than in-place activities. Moreover, the exemplary embodiments leverage the moving variance to segment a long-term CSI trace. Since such a trace may often contain multiple different activities over time, moving variance may be used to determine the start and end of individual activities.

More particularly, the Coarse Activity Determination Module 122 may distinguish between walking activities and in-place activities according to the following process. CSI samples of P subcarriers may be expressed as C={C(1), . . . , C(p), . . . , C(P)}, where C(p)=[c$_1$(p), . . . , c$_T$(p)]' represents T CSI amplitudes on the p$^{th}$ subcarrier. The moving variances of the P subcarriers may be expressed as V={V(1), . . . , V(p), . . . , V(P)}, where V(p)=[v$_1$(p), . . . , v$_T$(p)] are the moving variances derived from C(P). The Coarse Activity Determination Module 122 may then calculate the cumulative moving variance of a series CSI samples of the data sample 104 crossing P subcarriers using the expression $V = \Sigma_{p=1}^{P} V(p)$.

The Coarse Activity Determination Module 122 may then examine the cumulative moving variances, calculated as described above, to determine whether a collected set of CSI samples contains a walking activity or an in-place/no activity. Such determination may be made based on a threshold $\tau_v$; if the maximum cumulative moving variance max(V) is larger than the threshold $\tau_v$, the CSI samples of the data sample 104 are determined to contain a walking activity, otherwise they are determined to contain an in-place/no activity. In an embodiment, a threshold $\tau_v$=20 may be used.

Next, the exemplary embodiments may identify activities by calculating the similarity between a measured CSI segment and a plurality of pre-constructed activity profiles. Based on the characteristics of walking and in-place activities, two separate similarity metrics and classifiers are used.

For identification of walking activities, the exemplary system 100 includes a Walking Activity Tracking Module 130, which includes a Multiple-Dimensional Dynamic Time Warping ("MD-DTW") module 132, which can align a trace with larger CSI changes to the profile while correcting for differences in speed. A DTW technique may stretch and compress required parts to allow a proper comparison between two data sequences (e.g., between a data sample and an activity profile). This is useful to match CSI samples from different walking speeds in real-world scenarios. In an embodiment, the MD-DTW module 132 uses the vector norm to calculate the distance matrix according to the expression:

$$d(c_i, c'_j) = \sum_{p=1}^{P} (c_i(p) - c'_j(p))^2$$

In the above expression, C=c$_1$, c$_2$, . . . , c$_T$ and C'=c'$_2$, . . . , c'$_T$ are two CSI sequences to be used for walking path discrimination, and P is the number of dimensions (e.g., subcarriers) of the sequence data (e.g., for a CSI sample, P may be 30). The MD-DTW Module 132 may find a least cost path through this matrix and the MD-DTW distance may be the sum of matrix elements along the path. During activity identification, the MD-DTW Module 132 of the exemplary system 100 may distinguish each walking activity by calculating the MD-DTW distance between the CSI measurements of the data sample 104 and all the known walking activities in CSI profiles, which, in the exemplary system 100, are stored for known activities. If the MD-DTW distance from the CSI measurements of the data sample 104 to the CSI measurements of one of the stored CSI profiles is less than a threshold (i.e., which allows the data sample 104 to be considering as corresponding to a known activity), the MD-DTW Module 132 may then regard the activity corresponding to the CSI profile with the minimum distance as the being activity identified for the data sample 104.

For in-place activities, the exemplary system 100 includes an In-Place Activity Identification Module 140, which considers CSI distributions (e.g., histograms) rather than the exact time series contained in the data sample 104 to achieve higher robustness to the repetitive but often more random patterns generated by such activities. The In-Place Activity Identification Module 140 includes a CSI Distribution Extraction Module 142, which determines CSI distributions based on the CSI time series contained in the data sample 104, and an EMD Comparison Module 142, which uses an Earth Mover's Distance ("EMD") approach to calculates a minimal cost to transform one distribution to another, to quantify the similarity of two distributions.

More particularly, the In-Place Activity Identification Module 140 identifies CSI measurements from the data sample 104 as a candidate to correspond to a particular known in-place activity if the EMD distance from the CSI distribution for the candidate to the CSI distribution for the known in-place activity is the minimum among the EMD distances to all known CSI distributions stored in the CSI profiles. The In-Place Activity Identification Module 140 then confirms that the candidate corresponds to the known in-place activity by comparing the resulting minimal EMD distance (i.e., between the CSI distribution for the candidate from the data sample 104 and the CSI distribution for the known in-place activity) to a threshold, which can be empirically determined during profile construction. The In-Place Activity Identification Module 140 may confirm the CSI measurement from the data sample as corresponding to the known in-place activity med if the minimal EMD distance is less than the threshold; otherwise, the In-Place Activity Identification Module 140 may identify the CSI measurement from the data sample 104 as corresponding to an unknown activity.

As an alternate technique to determine whether the CSI measurements of the data sample 104 correspond to a known activity, the In-Place Activity Identification Module 140 may use an outlier detection method (e.g., the median absolute deviation method), to examine whether the resultant minimum EMD distance is within a range. To determine the range, the In-Place Activity Identification Module 140 may use an EMD distance pool containing the minimal EMD distances of previous successfully identified activities. The In-Place Activity Identification Module 140 may recognize the same in-place activities occurring in different locations by comparing the CSI measurements from the data sample 140 to a set of CSI profiles constructed when the same activities occur in different locations. In such case, the profile for an activity includes a set of CSI profiles instead of a single CSI profile, and the CSI measurements of the data sample 104 may be deemed to contain the activity if they have a minimum EMD distance to any of the CSI profiles belonging to the activity profile.

The system 100 may include a Data Fusion Module 124, which may fuse (e.g., combine) data from a plurality of links (e.g., communication between the access point 102 and a plurality of stationary devices in the environment) to improve the accuracy of determinations made by the system 100. In an embodiment, the Data Fusion Module 124 identifies an activity using data from a plurality of links by identifying an activity that minimizes the sum of the similarity measurements for each of the plurality of links (where a minimal sum indicates a most likely activity because a lowest similarity measurement indicates a most similar activity). In an embodiment, the sums may be weighted. In an embodiment, fewer than all of a plurality of links may be used. In an embodiment, a link may not be used if its CSI data indicates an empty room.

If either the Walking Activity Tracking Module 130 or the In-Place Activity Identification Module 140 makes a determination that the activity detected in the data sample 104 is a match to one of the profiles 180, the activity is deemed to be a known activity 150. If not, the activity is deemed to be an unknown activity 152, and data concerning the unknown activity 152 may be passed to the Profile Construction and Updating Module 160 for use as will be described below.

It will be apparent to those of skill in the art that the specific analytic approaches described herein, such as MD-DTW and EMD, are only exemplary, and that other techniques for evaluating the similarity of two data samples may be used without departing from the broader concepts of the exemplary embodiments.

To construct activity profiles, the exemplary system 100 includes a Profile Construction and Updating Module 160, which may utilize a semi-supervised approach. The Profile Construction and Updating Module 160 may start with a data set resulting from continuous monitoring of a target environment and may include a Non-Profile Based Clustering Module 162 to identify multiple similar instances of an activity without a matching profile in such a data set. A Construction Module 164 may then use User Feedback 170 to label the resulting clusters to define Profiles 180. User Feedback 170 may also be used by the Adaptive Updating Module 166 to detect and update activity profiles after significant changes in the environment (e.g., a media console WiFi device has been moved from one side of the room to the other side, furnishings within the home have been significantly altered, etc.).

Through the use of the exemplary system 100, it may be observed that an in-place activity may result in a relatively stable distribution of CSI amplitude due to the presence of the human body and, in some cases (e.g., cooking in front of a stove, eating at a table), repetitive body movement over time. Furthermore, different in-place activities may cause different distributions of CSI amplitude, because the location, the repetitive body movement patterns, and/or the posture of the human body may be different than for different in-place activities.

Figure 2A:
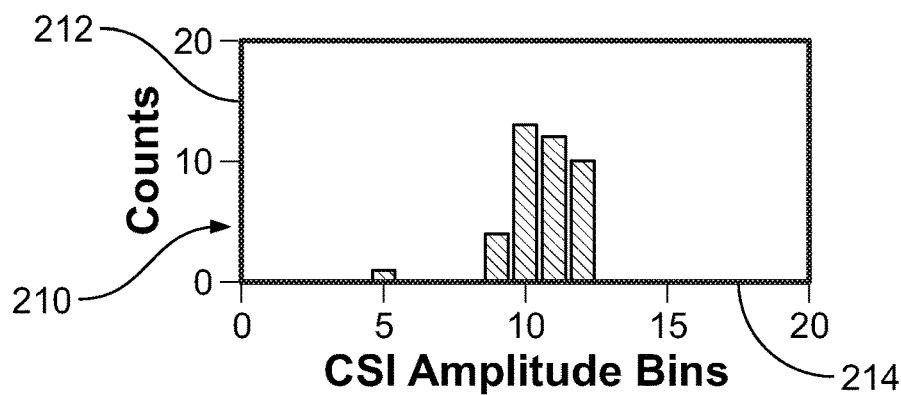
FIG. 2A illustrates CSI amplitude bins for a first instance of a first in-place activity.
Figure 2B:
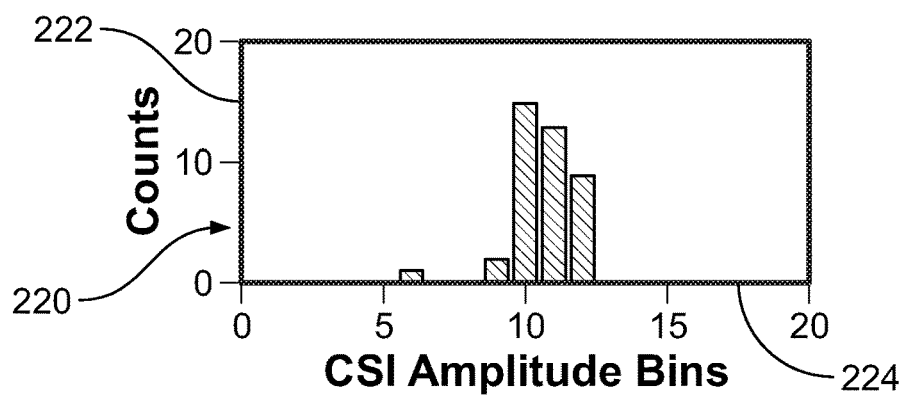
FIG. 2B illustrates CSI amplitude bins for a second instance of the first in-place activity.
Figure 2C:
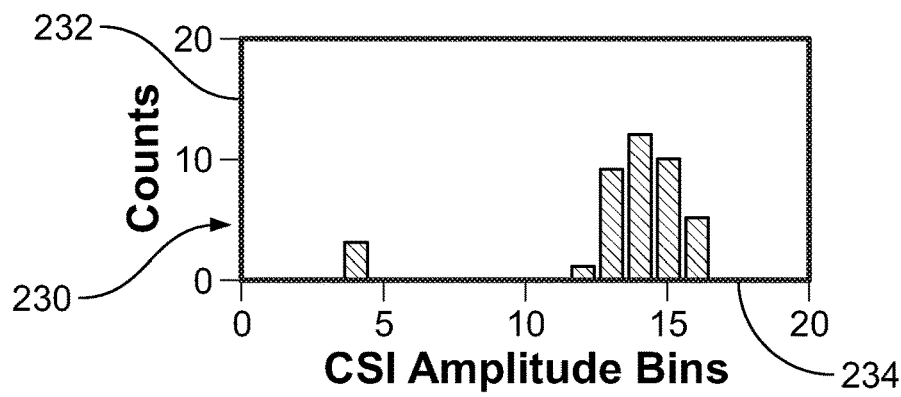
FIG. 2C illustrates CSI amplitude bins for a first instance of a second in-place activity.
Figure 2D:
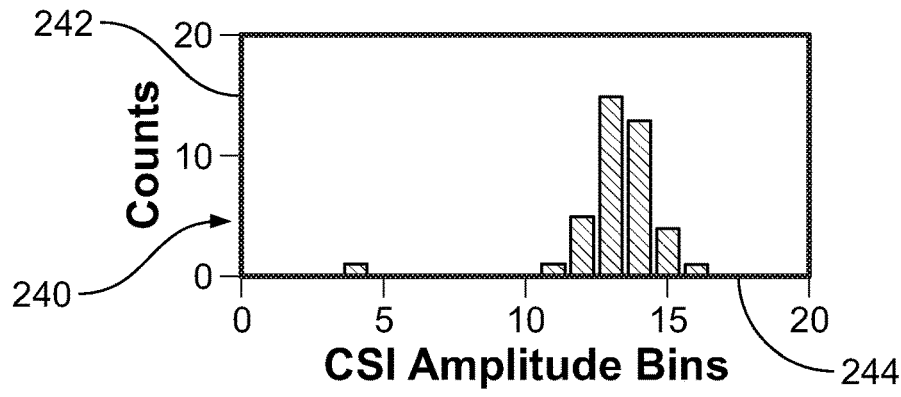
FIG. 2D illustrates CSI amplitude bins for a second instance of the second in-place activity.

FIGS. 2A-2D illustrate the similarity of the CSI amplitude distribution for the same activity, and the differences between the CSI amplitude distributions for two different in-place activities at a particular subcarrier (e.g., subcarrier 12). FIG. 2A illustrates a CSI amplitude distribution 210 showing counts 212 for each of a plurality of amplitude ranges 214 for a first instance of cooking in a kitchen. FIG. 2B illustrates a CSI amplitude distribution 220 showing counts 222 for each of a plurality of amplitude ranges 224 for a second instance of cooking in a kitchen. FIG. 2C illustrates a CSI amplitude distribution 230 showing counts 232 for a plurality of amplitude ranges 234 for a first instance of sleeping on a bed. FIG. 2D illustrates a CSI amplitude distribution 240 showing counts 242 for a plurality of amplitude ranges 244 for a second instance of sleeping on a bed. It may be seen that the CSI amplitude distributions are similar for different instances of the same activity (e.g., that the distributions 210 and 220 are similar to one another and that the distributions 230 and 240 are similar to one another), but distinctive for different activities (e.g., that the distributions 210 and 220, while similar to one another, are not similar to the distributions 230 and 240). Based on the observation demonstrated by FIGS. 2A-2D, it may be seen that CSI amplitude distribution may be used to distinguish different in-place activities and that a particular observed in-place activity can be identified by comparing the CSI amplitude distribution for the activity against known profiles. As noted above, the exemplary embodiments therefore employ the EMD technique, which is a known approach for evaluating the similarity between two probability distributions, to distinguish different in-place activities.

Figure 3A:
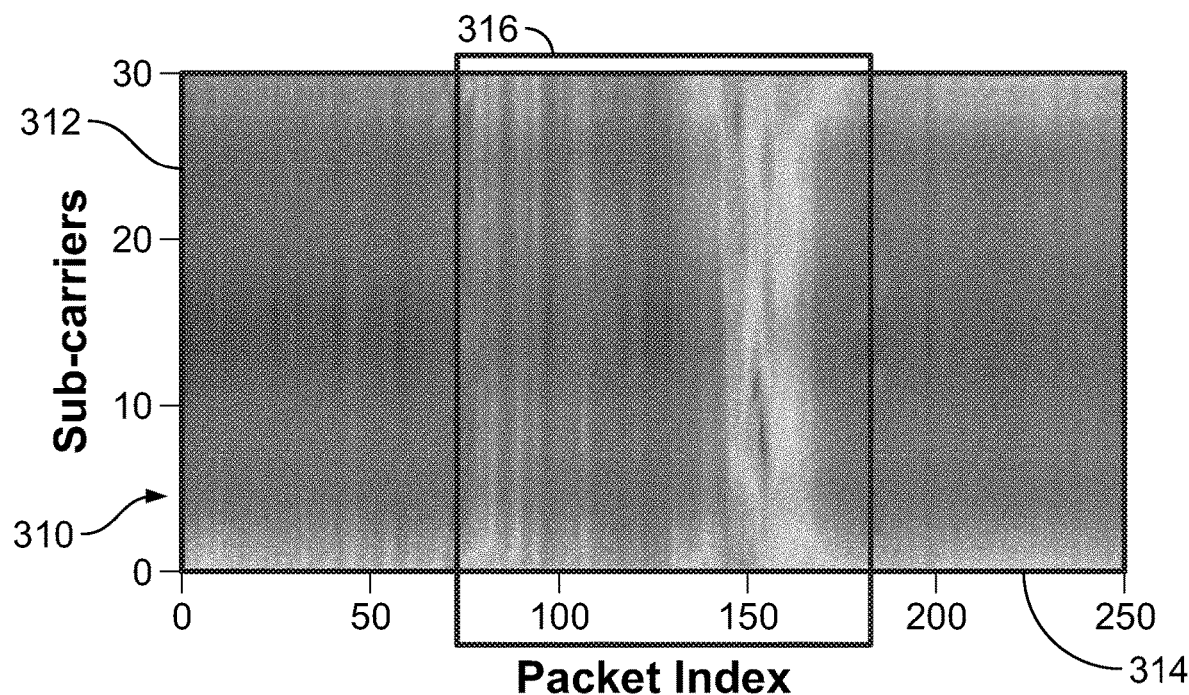
FIG. 3A illustrates CSI time series for a first instance of a first walking path.
Figure 3B:
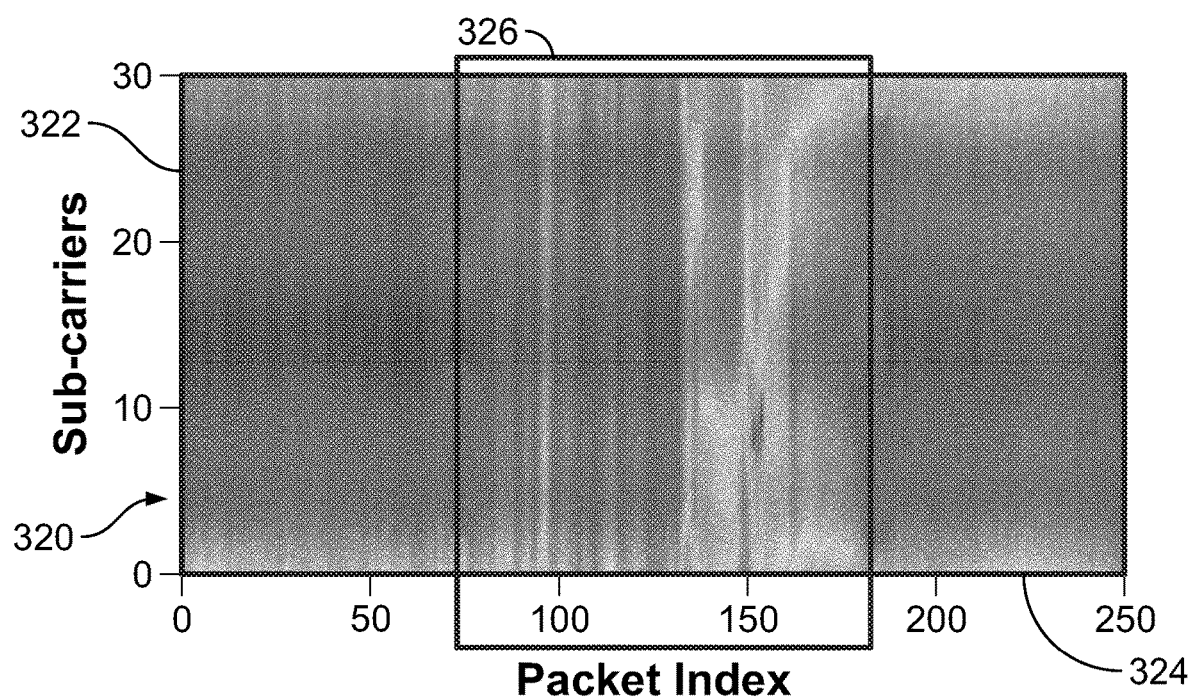
FIG. 3B illustrates CSI time series for a second instance of the first walking path.
Figure 3C:
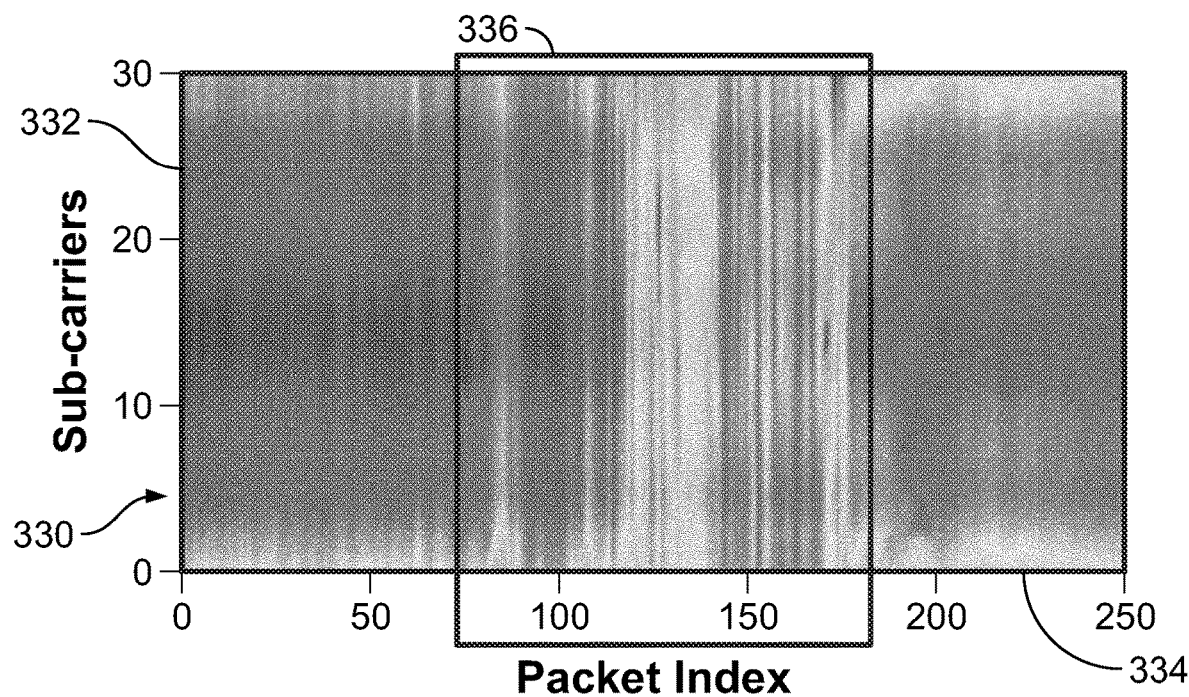
FIG. 3C illustrates CSI time series for a first instance of a second walking path.
Figure 3D:
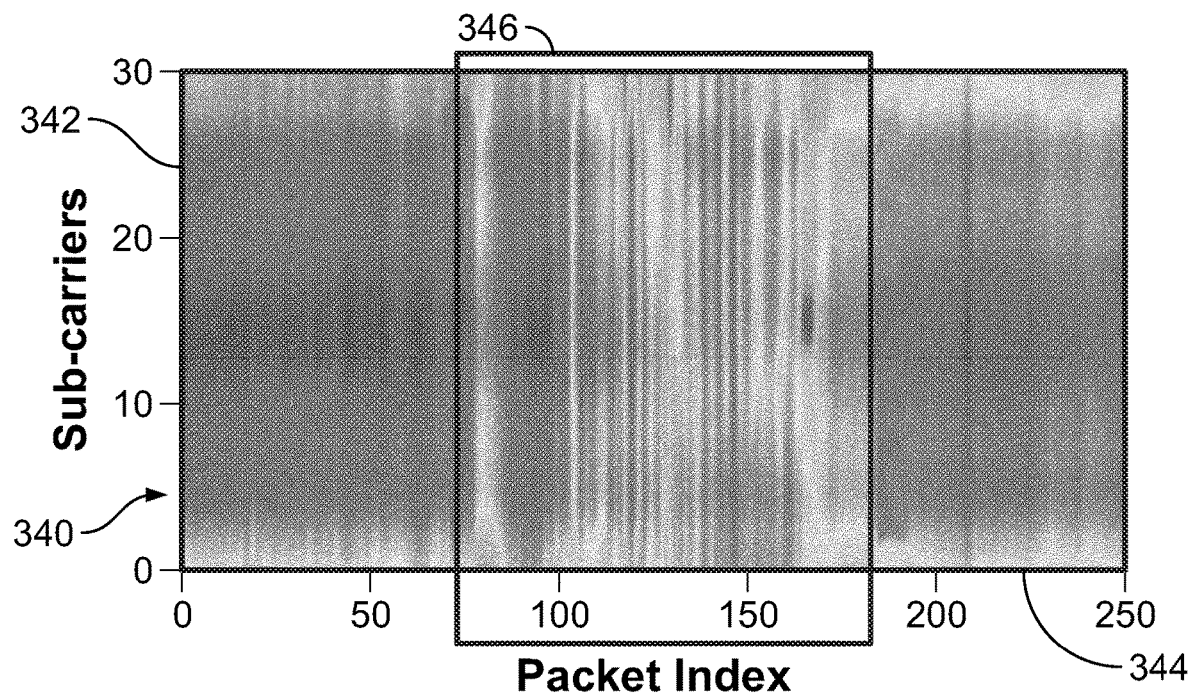
FIG. 3D illustrates CSI time series for a second instance of the second walking path.

Through the use of the exemplary system 100, it may also be observed that the CSI collected from walking activities may change constantly over time due to body movement and change of locations. FIGS. 3A-3D illustrate the similarity of recorded CSI amplitude measurements for two instances of the same walking path and the differences between recorded CSI amplitude measurements for different walking paths. More specifically, FIGS. 3A-3D present CSI amplitude of each subcarrier versus the packet index (e.g., time series) for two instances of two different walking paths. FIG. 3A illustrates a CSI time series 310 showing active sub-carriers 312 during the time period represented by a packet index 314 (i.e., where each packet during the packet index follows the previous packet in a time series) for a first instance of a first walking path. FIG. 3B illustrates a CSI time series 320 showing active sub-carriers 322 during the time period represented by a packet index 324 for a second instance of the first walking path. FIG. 3C illustrates a CSI time series 330 showing active sub-carriers 332 during the time period represented by a packet index 334 for a first instance of a second walking path. FIG. 3D illustrates a CSI time series 340 showing active sub-carriers 342 during the time period represented by a packet index 344 for a second instance of the second walking path. From FIGS. 3A-3D, it may be seen that the CSI measurements exhibit similar changing patterns for different instances of the same walking path (i.e., that the CSI time series 310 and 320 are similar to one another and that the CSI time series 330 and 340 are similar to one another), whereas the changes of CSI measurements over time are distinct for different trajectories (i.e., that the CSI time series 310 and 320, while similar to one another, are not similar to the CSI time series 330 and 340). Based on this observation, it may be inferred that a CSI pattern is dominated by the unique path of each walking activity. Since people may walk at different speeds for a same trajectory, as discussed above the exemplary embodiments use Dynamic Time Warping ("DTW") to align tested CSI measurements to those of known activities in a profile. The exemplary embodiments may then identify an activity contained represented by the tested CSI measurements based on similarity measures determined using DTW.

EXPERIMENTAL RESULTS

Figure 4:
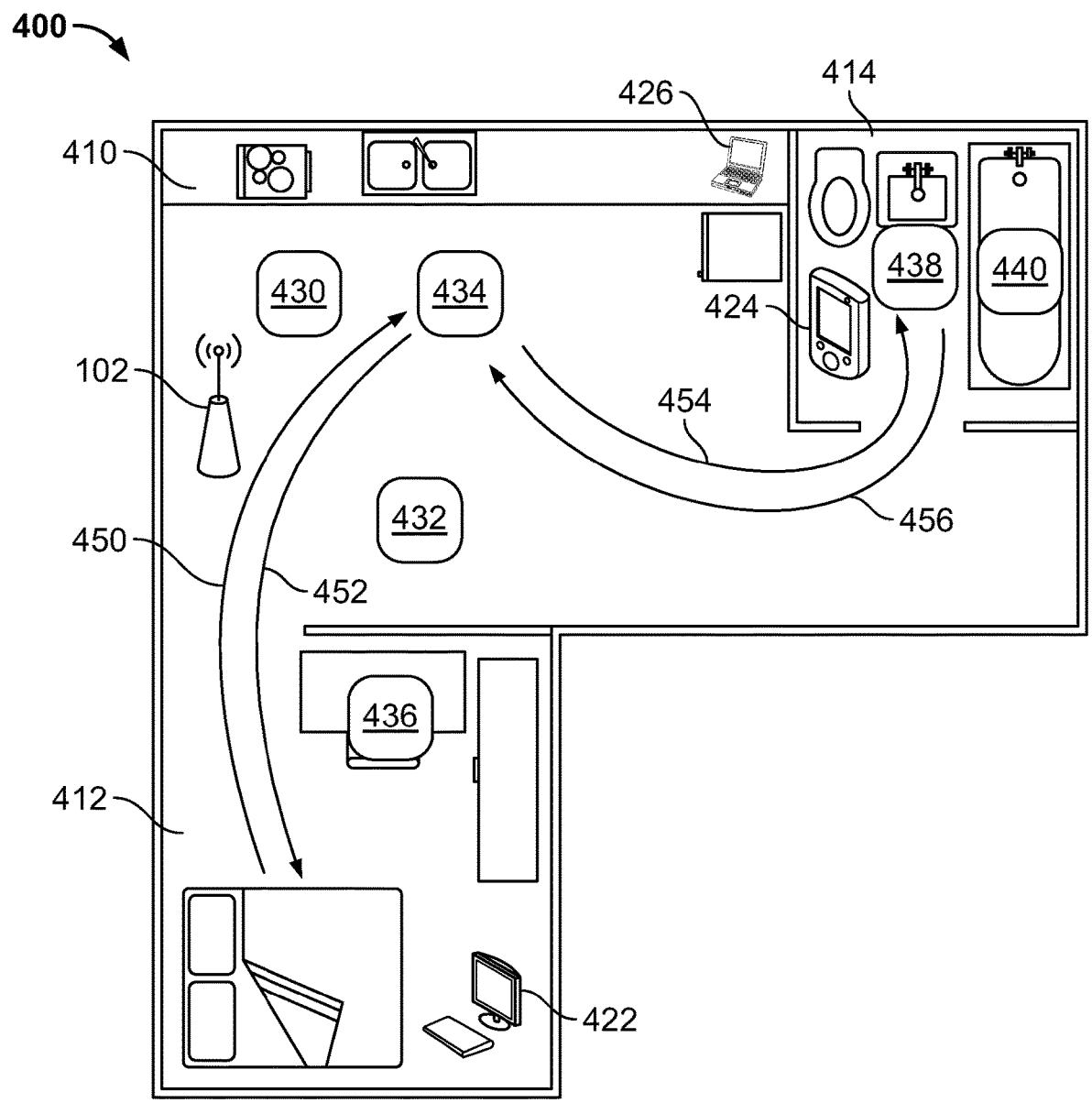
FIG. 4 is a floor plan of an apartment in which the exemplary system of FIG. 1 was tested.

The exemplary embodiments were evaluated in two apartments of different sizes. FIG. 4 illustrates a floor plan 400 of the smaller of the two apartments, a one-bedroom apartment, which was about 23 ft×20 ft. The apartment shown in FIG. 4 includes a kitchen 410, a bedroom 412, and a bathroom 414. An access point 102 is positioned in the kitchen 410, and communicates with stationary devices 420 (positioned in the kitchen 410), 422 (positioned in the bedroom 412), and 424 (positioned in the bathroom 414). Various locations shown in FIG. 4 correspond to various in-place activities; for example, location 430 corresponds to cooking at the stove, location 432 corresponds to sitting at the kitchen table, location 434 corresponds to washing dishes at the sink, location 436 corresponds to sitting in the bedroom 412, location 438 corresponds to brushing teeth at the sink, and location 440 corresponds to bathing. Various trajectories shown in FIG. 4 correspond to various walking trajectories; for example, trajectory 450 corresponds to walking from the bedroom 412 to the kitchen 410, trajectory 452 corresponds to walking from the kitchen 410 to the bedroom 412, trajectory 454 corresponds to walking from the kitchen 410 to the bathroom 414, and trajectory 456 corresponds to walking from the bathroom 414 to the kitchen 410.

The larger of the two apartments, a two-bedroom apartment, was about 24 ft×36 ft with two bedrooms, one storeroom, one kitchen, one living room, and one bathroom. A total of 9 typical daily in-place activities and 8 walking activities with different walking speeds were performed in both apartments. It may be typical for in-place activities to occur at dedicated locations in home environments (e.g., activities in a kitchen may occur just in front of the sink or stove, beside the refrigerator, or at the dining table; whereas activities in a living room may usually occur on the couch). In the experiments described herein, profiles were generated in one day and testing data was collected over different days. Over the days, one chair was moved to a different room, coffee makers were moved around in the kitchen, and items on tables, such as bowls and bottles, were moved, as may be typical in daily life. A profile was also built for the empty room when there is no one at home.

For in-place activities, the exemplary embodiments achieved an average identification accuracy of 97% in the one-bedroom apartment, with a standard deviation of 5.66%; for the two-bedroom apartment, the exemplary embodiments achieved an average identification accuracy of 97.38%, with a standard deviation of 4.31%. For walking activities, the exemplary embodiments achieved an average identification accuracy of 97% in the one-bedroom apartment, and achieved an accuracy of 99.17% in detecting doorway passing; for the two-bedroom apartment, the exemplary embodiments achieved an average accuracy of 94% in identifying walking activities, and achieved an accuracy of 95.83% in detecting doorway passing.

As described above, the exemplary embodiments use off-the-shelf WiFi devices for activity recognition. The exemplary embodiments may provide fine-grained activity recognition by re-using existing home WiFi equipment, and, therefore, have much a high degree of scalability for wide deployment. Furthermore, the exemplary embodiments may be able to discriminate loosely defined daily activities that involve a series of body movements over a certain period of time. In recognizing such loosely defined daily activities, the channel characteristics used by the exemplary embodiments, such as the statistical distribution and time series, may be especially suitable for distinguishing between activities lasting a certain period of time.

The various embodiments disclosed herein can be implemented as hardware, firmware, software, or any combination thereof. Moreover, software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

Figure 5:
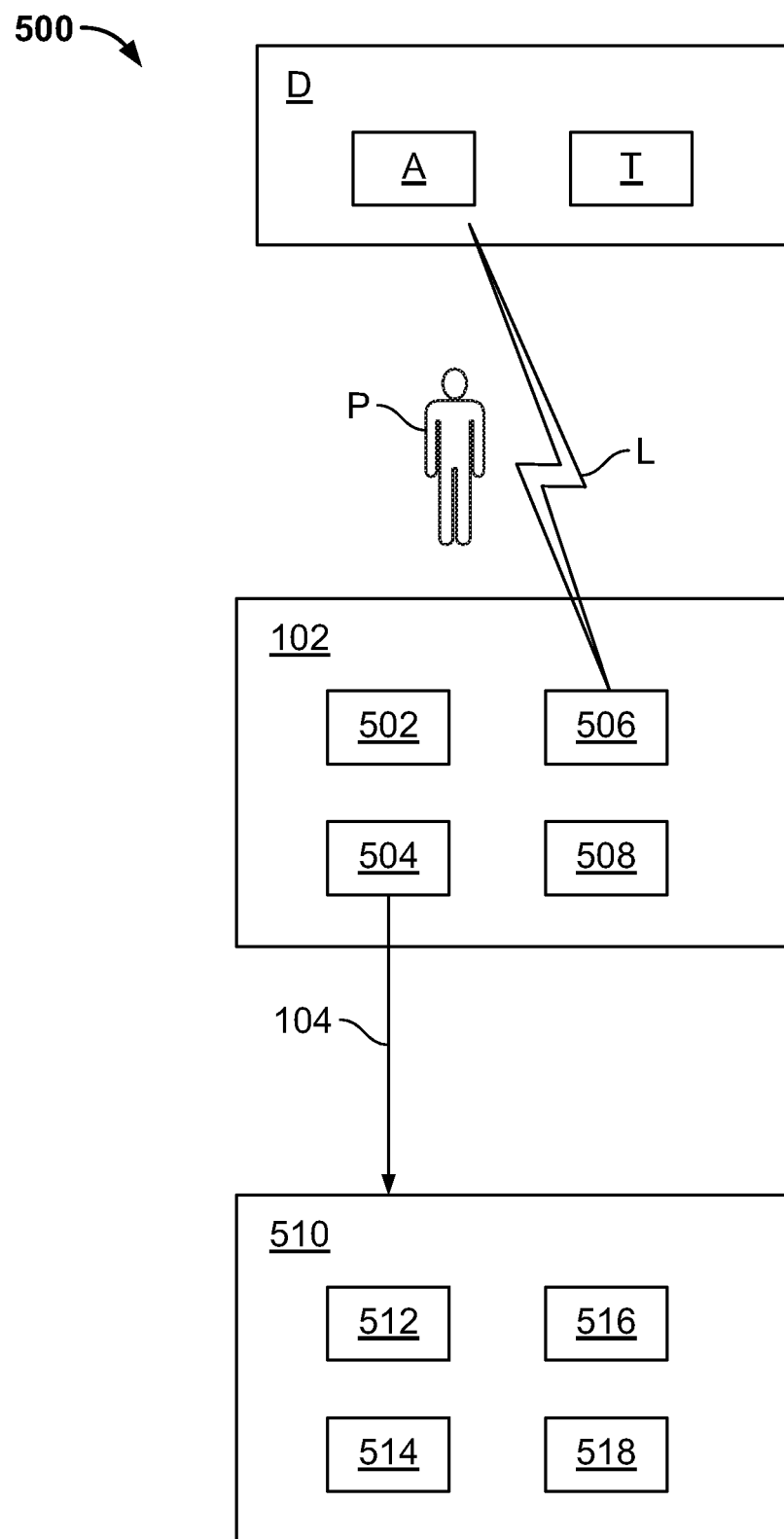
FIG. 5 is a schematic illustration of the hardware elements of an exemplary system.

FIG. 5 shows one exemplary embodiment of a system 500 as described above. The system 500 includes an access point 102. The access point 102 may include a processor 502 (e.g., a CPU), a memory 504 (e.g., a flash memory, etc., including the possibility that more than one type of memory may be present), one or more antennas 506, and a transceiver 508 coupled to the one or more antennas 506 so as to control the transmission and receipt of data thereby. It will be apparent to those of skill in the art that the access point 102 may include other elements not specifically referenced herein. The access point 102 communicates with a stationary device D, as described above, by a wireless communication link L. The stationary device D includes at least an antenna A and a transceiver T, and may also include various other elements depending on the nature of the stationary device D. A person P may be disposed within the same environment as the access point 102 and the stationary device D; as described above, the access point 102 may tune the parameters (e.g., as encapsulated in CSI data) of the wireless communication link L based on the position of the person P, and the exemplary embodiments may infer the position or motion of the person P based on such data.

Continuing to refer to FIG. 5, in an embodiment, a computing system 510 may make such determination. The computing system 510 may include a processor 512 (e.g., a CPU), a memory 514 (e.g., a hard drive, a flash memory, RAM, etc., including the possibility that the memory 514 may include more than one type of memory), a data interface 516 (e.g., a wired or wireless network connection), and a user interface 518. It will be apparent to those of skill in the art that the computing system 510 may include other elements not specifically referenced herein. The computing system 510 may implement some or all of the modules described above with reference to FIG. 1. In an embodiment, the computing system 510 may be integrated with the access point 102. In an embodiment, the computing system 510 may be constantly connected with the access point 102 and may receive data samples 104 constantly, periodically, as requested, or at some other time frequency. In an embodiment, the computing system 510 may be selectively connected with the access point 102 and may receive data samples 104 periodically, as requested, or at some other time frequency.

It should be understood that the embodiments described herein are merely exemplary in nature and that a person skilled in the art may make many variations and modifications thereto without departing from the scope of the present invention. All such variations and modifications, including those discussed above, are intended to be included within the scope of the invention.

The invention claimed is:

1. A system, comprising:
a monitoring device configured to determine an activity of a person in an environment, said monitoring device including:
a memory including at least one stored activity profile, said at least one stored activity profile including at least one channel state information profile corresponding to a particular human activity;
a processor configured to receive at least one wireless channel state information data set from at least one communication device positioned in the environment; and
an activity identification module including a walking activity tracking module and an in-place activity identification module, wherein said activity identification module includes logic instructions configured to be executable by said processor for enabling said monitoring device to determine at least one activity of said person in said environment based on a comparison of said at least one wireless channel state information data set to said at least one stored activity profile, and to distinguish between a walking activity and an in-place activity of said person by determining a moving variance based on said at least one channel state information data set.

2. The system of claim 1, wherein said at least one stored activity profile is determined based on user feedback.

3. The system of claim 2, wherein said monitoring device determines a person's activity by clustering similar channel state information samples in an initial data set to produce clustered channel state information samples and receiving user input corresponding to said clustered channel state information samples to define one of said at least one stored activity profile.

4. The system of claim 2, wherein, when said monitoring device determines that no activity profile of said at least one stored activity profile matches said at least one wireless channel state information data set, said monitoring device receives user input to define a new activity profile for said at least one wireless channel state information data set.

5. The system of claim 1, wherein said monitoring device filters said at least one wireless channel state information data set before determining a person's activity.

6. The system of claim 5, wherein said monitoring device filters said at least one wireless channel state information data set by applying a dynamic exponential smoothing filter to said at least one wireless channel state information data set.

7. The system of claim 5, wherein said monitoring device filters said at least one wireless channel state information data set by removing, from said at least one wireless channel state information data set, data points having a modulation and coding scheme index less than a threshold value.

8. A system, comprising:
a monitoring device configured to determine motion of a person in an environment based on motion of said person through a WiFi radio frequency field, said monitoring device including:
a memory including at least one stored activity profile, said at least one stored activity profile including at least one channel state information profile corresponding to a particular human activity;
a processor configured to receive at least one wireless channel state information data set from at least one communication device positioned in the environment, said at least one communication device being configured and arranged to transmit said WiFi radio frequency field; and
an activity identification module including logic instructions configured to be executable by said processor for enabling said monitoring device to determine motion of the person in the environment using a moving variance based on a comparison of said at least one wireless channel state information data set to said at least one stored activity profile.

9. The system of claim 8, wherein said at least one stored activity profile is determined based on user feedback.

10. The system of claim 9, wherein said monitoring device determines said motion of the person in the environment by clustering similar channel state information samples in an initial data set to produce clustered channel state information samples and receiving user input corresponding to said clustered channel state information samples to define one of said at least one stored activity profile.

11. The system of claim 9, wherein, when said monitoring device determines that no activity profile of said at least one stored activity profile matches said at least one wireless channel state information data set, said monitoring device receives user input to define a new activity profile for said at least one wireless channel state information data set.

12. The system of claim 8, wherein said monitoring device filters said at least one wireless channel state information data set before determining said motion of the person in the environment.

13. The system of claim 12, wherein said monitoring device filters said at least one wireless channel state information data set by applying a dynamic exponential smoothing filter to said at least one wireless channel state information data set.

14. The system of claim 12, wherein said monitoring device filters said at least one wireless channel state information data set by removing, from said at least one wireless channel state information data set, data points having a modulation and coding scheme index less than a threshold value.

15. A system, comprising:
a monitoring device configured to determine an activity of a person in an environment, said monitoring device including:
a memory including at least one stored activity profile, said at least one stored activity profile including at least one channel state information profile corresponding to a particular human activity;
a processor configured to receive at least one wireless channel state information data set from at least one communication device positioned in the environment; and
an activity identification module including a walking activity tracking module and an in-place activity identification module, wherein said activity identification module includes logic instructions configured to be executable by said processor for enabling said monitoring device to determine known activity or unknown activity of the person in the environment using a moving variance based on a comparison of said at least one wireless channel state information data set to said at least one stored activity profile.

16. The system of claim 15, wherein said at least one stored activity profile is determined based on user feedback.

17. The system of claim 16, wherein said monitoring device determines said activity of the person in the environment by clustering similar channel state information samples in an initial data set to produce clustered channel state information samples and receiving user input corresponding to said clustered channel state information samples to define one of said at least one stored activity profiles.

18. The system of claim 16, wherein, when said monitoring device determines said activity of the person in the environment is an unknown activity, said monitoring device receives user input to define a new activity profile for said at least one wireless channel state information data set.

19. The system of claim 15, wherein said monitoring device filters said at least one wireless channel state information data set before determining a person's activity by applying a dynamic exponential smoothing filter to said at least one wireless channel state information data set.

20. The system of claim 19, wherein said monitoring device filters said at least one wireless channel state information data set by removing, from said at least one wireless channel state information data set, data points having a modulation and coding scheme index less than a threshold value.

* * * * *

UNITED STATES PATENT AND TRADEMARK OFFICE
CERTIFICATE OF CORRECTION

PATENT NO. : 10,992,774 B2
APPLICATION NO. : 16/746195
DATED : April 27, 2021
INVENTOR(S) : Chen et al.

Page 1 of 1

It is certified that error appears in the above-identified patent and that said Letters Patent is hereby corrected as shown below:

In the Specification

Column 1, Line 15, delete the heading and ensuing paragraph and replace with the following:
-- Statement Regarding Federally Sponsored Research
This invention was made with government support under Grant Numbers CNS1217387, CNS0845896 and IIS1211079 awarded by The National Science Foundation. The government has certain rights in the invention. --

Signed and Sealed this
First Day of June, 2021

Drew Hirshfeld
*Performing the Functions and Duties of the*
*Under Secretary of Commerce for Intellectual Property and*
*Director of the United States Patent and Trademark Office*